G. R. BOWMAN.
WATER COOLER, &c.
No. 106,113.  Patented Aug. 9, 1870.
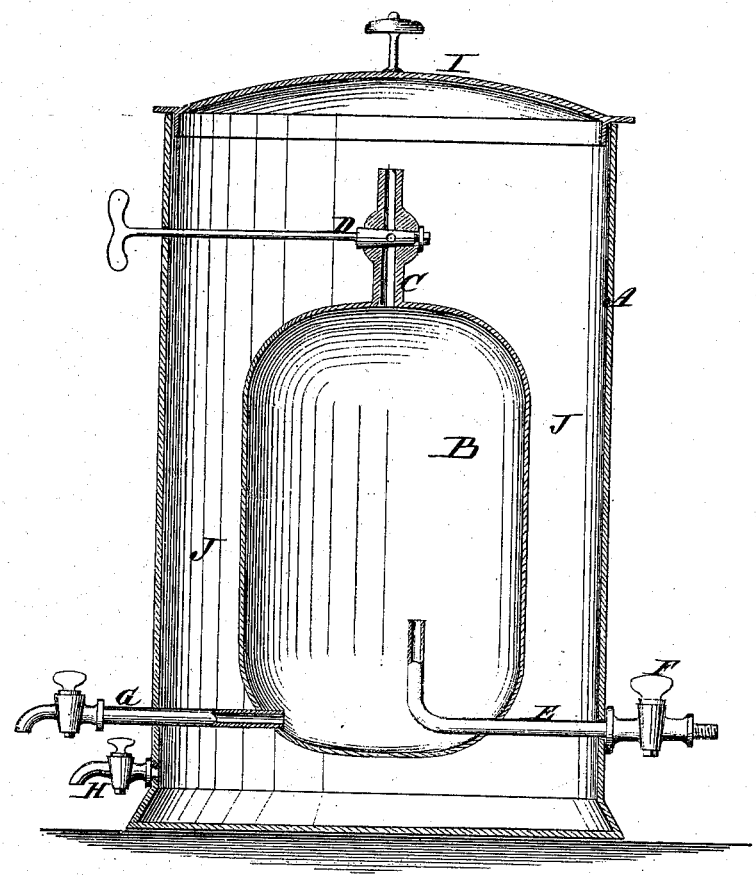

United States Patent Office.

GEORGE R. BOWMAN, OF HAGERSTOWN, MARYLAND.

Letters Patent No. 106,113, dated August 9, 1870.

IMPROVEMENT IN WATER-COOLER, &c.

The Schedule referred to in these Letters Patent and making part of the same.

*To all whom it may concern:*

Be it known that I, GEORGE R. BOWMAN, of Hagerstown, in the county of Washington and State of Maryland, have invented a new and useful Improvement in Coolers; and I do hereby declare that the following is a full, clear, and exact description thereof, which will enable others skilled in the art to make and use the same, reference being had to the accompanying drawing forming part of this specification.

My invention relates to and consists in an improvement in coolers, which will be first described and then clearly specified in the claim.

The accompanying drawing represents a vertical section of the cooler.

Similar letters of reference indicate corresponding parts.

A is the casing or outer vessel, made of any suitable material and of any desired form and size.

B is the inner vessel, occupying a central position in the vessel A, either conical at the ends, as seen in the drawing, or of any other suitable form. This inner vessel may be supported in the outer vessel in any manner which may be found most convenient and proper. It should be sufficiently strong to withstand hydrant pressure, and for this purpose it may be made of copper, turned on the inside, or of any sufficiently strong material.

The upper portion of this inner vessel B is provided with a vent-tube, C, and vent-cock D, the handle of which cock passes through the casing or vessel A, as seen in the drawing.

E is a pipe, provided with a stop-cock, F, which is connected with the service-pipe of the hydrant or with the barrel or vessel containing ale, beer, or other liquid to be cooled.

G is a faucet, through which the cooled liquid is drawn.

Both pipe F and faucet G pass through the outer vessel and enter the inner vessel by water-tight joints.

H is a faucet, through which the water or liquid resulting from the ice or refrigerating compound is drawn off.

I is the cover of the vessel A.

J is the chamber or space around the inner vessel, in which the ice or refrigerating compound is placed, the service-pipe or the barrel of ale or other liquid (the latter being placed in an elevated position) being connected with the pipe E, and the vessel B being surrounding by ice or the cooling compound.

Upon turning the stop-cock F the vessel B will be filled with the liquid, (the vent-tube C having been opened to allow the air to escape, and closed,) the liquid will be discharged through the faucet G, effectually cooled, and ready for use.

Having thus described my invention,

I claim as new and desire to secure by Letters Patent—

Ice-chamber A, having the projecting lid I and faucet H combined with water-vessel B, having inlet and outlet-pipe at the bottom, while at the top an air-valve is operated from the outside, all as shown and described, and for the purpose specified.

GEORGE R. BOWMAN.

Witnesses:
T. B. CUSHWA,
J. A. HEFFENGER.